US010546355B2

(12) United States Patent
Babin et al.

(10) Patent No.: US 10,546,355 B2
(45) Date of Patent: Jan. 28, 2020

(54) SYSTEM AND TOOL TO CONFIGURE WELL SETTINGS FOR HYDROCARBON PRODUCTION IN MATURE OIL FIELDS

(71) Applicants: International Business Machines Corporation, Armonk, NY (US); LLC <<GAZPROMNEFT SCIENCE & TECHNOLOGY CENTRE>>, Saint-Petersburg (RU)

(72) Inventors: Vladimir M. Babin, Saint Petersburg (RU); David Echeverria Ciaurri, New York, NY (US); Nikolay G. Glavnov, Saint Petersburg (RU); Maria Golitsyna, Moscow (RU); Ramil R. Yaubatyrov, Saint Petersburg (RU); Alexander Pozdneev, Moscow (RU); Artyom Semenikhin, Moscow (RU); Oleg S. Ushmaev, Moscow (RU)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 15/298,893

(22) Filed: Oct. 20, 2016

(65) Prior Publication Data
US 2018/0114281 A1    Apr. 26, 2018

(51) Int. Cl.
*G06Q 50/06* (2012.01)
*G06Q 10/06* (2012.01)
(Continued)

(52) U.S. Cl.
CPC ......... *G06Q 50/06* (2013.01); *E21B 41/0092* (2013.01); *G06Q 10/067* (2013.01);
(Continued)

(58) Field of Classification Search
CPC ............. G06Q 50/06; G06Q 10/06312; G06Q 10/06393; G06Q 10/067; E21B 41/0092
(Continued)

(56) References Cited

U.S. PATENT DOCUMENTS 4,738,313 A    4/1988  McKee
6,519,531 B1   2/2003  Batycky et al.
(Continued)

FOREIGN PATENT DOCUMENTS

EA    200800359 A2    6/2008
RU      2066738 C1    9/1996
(Continued)

OTHER PUBLICATIONS

Echeverria Ciaurri, D., et al., "Application of derivative-free methodologies to generally constrained oil production optimisation problems", International Journal of Mathematical Modelling and Numerical Optimisation, 2011 (Month Unknown), pp. 134-161, vol. 2, No. 2.

(Continued)

*Primary Examiner* — Dylan C White
(74) *Attorney, Agent, or Firm* — Scully, Scott, Murphy & Presser, P.C.; Kristofer Haggerty, Esq.

(57) ABSTRACT

Configuring well settings may include determining schedules over a mid-term horizon for well settings for all or a subset of wells in an oil field. The schedule may be generated so that a performance metric for the considered horizon is maximized. An economic metric, for example, a net present value, and production metrics, for example, cumulative oil production, are considered. Minimum acceptable short-term and long-term metrics, for example, short-term and long-term cumulative field oil production, may be included as target/constraints.

20 Claims, 8 Drawing Sheets

(51) Int. Cl.
*E21B 41/00* (2006.01)
*G01V 99/00* (2009.01)

(52) U.S. Cl.
CPC . *G06Q 10/06312* (2013.01); *G06Q 10/06393* (2013.01); *G01V 99/005* (2013.01)

(58) Field of Classification Search
USPC ........................................................ 705/7.22
See application file for complete search history.

(56) References Cited

U.S. PATENT DOCUMENTS

| | | | |
|---|---|---|---|
| 7,878,268 B2 | 2/2011 | Chapman et al. | |
| 8,670,966 B2 | 3/2014 | Rashid et al. | |
| 9,228,415 B2 | 1/2016 | Ingham et al. | |
| 2009/0157590 A1* | 6/2009 | Mijares ................... | E21B 43/00 706/61 |
| 2014/0365409 A1* | 12/2014 | Burch ................. | E21B 41/0092 706/12 |
| 2015/0356521 A1 | 12/2015 | Sridhar et al. | |
| 2017/0364043 A1* | 12/2017 | Ganti ................... | G05B 13/048 |
| 2018/0258761 A1* | 9/2018 | Babin ................ | G06F 17/5009 |

FOREIGN PATENT DOCUMENTS

| | | | | |
|---|---|---|---|---|
| RU | 2010114583 A | 10/2011 | | |
| SU | 857452 | 8/1981 | | |
| WO | WO-2005041101 A1 * | 5/2005 | ............. | G06Q 40/00 |

OTHER PUBLICATIONS

Sarma, P., et al., "Production Optimization With Adjoint Models Under Nonlinear Control-State Path Inequality Constraints", SPE Reservoir Evaluation and Engineering, Apr. 2008, pp. 326-339.

Voznyuk, A.S., et al., "Multi-Criteria Analysis and Optimization of Waterflood Systems in Brownfields", SPE International, SPE Russian Oil and Gas Exploration and Production Technical Conference and Exhibition, Oct. 2014, pp. 1-15.

* cited by examiner

SYSTEM AND TOOL TO CONFIGURE WELL SETTINGS FOR HYDROCARBON PRODUCTION IN MATURE OIL FIELDS

FIELD

The present application relates generally to mature oil fields and hydrocarbon production, and particularly to configuring well settings for hydrocarbon production in mature oil fields.

BACKGROUND

The management of mature oil fields (also known as brownfields) is principally based on the periodical setting of well controls, which may also include shutting wells in and switching injectors/producers to producers/injectors. Expensive capital investments such as the drilling of new wells are not typically contemplated in mature fields. Thus, mature oil fields can be an attractive component of a field portfolio of an oil and gas company, for example, in periods where hydrocarbon sale price has a relatively low value.

Examples of well settings include wellhead choke size at injector wells or frequency of electrical pumps at producers. The modification of these settings can be an arduous task that cannot be performed with arbitrary frequency. Available state-of-the-art solutions provide well controls that are very difficult to use directly in the real field.

While brownfield management in industry may include heuristic procedures adjustment of well settings, even with computational efficiency, in general, the existing mechanisms may lack accuracy (e.g., in terms of solution optimality) and robustness, for example, as the existing mechanisms may not be based on formal, solid principles and, thus, in some cases may fail unexpectedly and not provide satisfactory results.

BRIEF SUMMARY

A method and system of configuring well settings for wells in oil production field may be provided. The method, in one aspect, may include receiving a baseline schedule of well settings for a plurality of wells in the oil production field over a mid-term horizon, the baseline schedule representing a current schedule in initial iteration. The method may also include generating a mid-term production prediction for a fluid production for each of the plurality of wells during the mid-term horizon by executing an integrated model that combines surface infrastructure and reservoir flow based on the current schedule of well settings for the plurality of wells. The method may also include executing a plurality of decline models calibrated with respect to the mid-term production prediction and approximating a long-term production prediction for the plurality of wells. The method may further include determining performance metrics based on the mid-term production prediction, which may include mid-term net present value, and on the long-term approximate production predictions, which may include a recovery factor for all field production in the plurality of wells, by executing an economic model that may include mid-term estimation of oil sale price and of production costs. The method may also include determining whether the performance metrics meet a defined criterion, for example, a number of constraints. The method may include, responsive to determining that the performance metrics do not meet the defined criterion, modifying the current schedule and repeating the generating, the executing, the determining performance metrics until the defined criterion is met. The method may also include, responsive to determining that the performance metrics meet the defined criterion, validating the current schedule of well settings for the plurality of wells and adjusting the current schedule based on the validating. The method may also include displaying on a graphical user interface device the current schedule of well settings for the plurality of wells. The method may also include generating a signal and transmitting the signal to automatically configure the well settings according to the current schedule of well settings for the plurality of wells.

A method of configuring well settings for wells in oil production field, in another aspect, may include receiving a baseline schedule of bottomhole pressure values for a plurality of wells in the oil production field over a mid-term horizon, the baseline schedule representing a current schedule in initial iteration. The method may also include generating a mid-term production prediction for a fluid production for each of the plurality of wells during the mid-term horizon by executing a reservoir flow model based on the current schedule of bottomhole pressure values for the plurality of wells. The method may also include executing a plurality of decline models calibrated with respect to the mid-term production prediction and approximating a long-term production prediction for the plurality of wells. The method may further include determining performance metrics based on the mid-term production prediction, which may include mid-term net present value, and on the long-term approximate production predictions, which may include a recovery factor for all field production in the plurality of wells, by executing an economic model that comprises mid-term estimation of oil sale price and of production costs. The method may also include determining whether the performance metrics meet a defined criterion, for example, a number of constraints. The method may further include, responsive to determining that the performance metrics do not meet the defined criterion, modifying the current schedule and repeating the generating, the executing, the determining performance metrics until the defined criterion is met. The method may also include, responsive to determining that the performance metrics meet the defined criterion, validating the current schedule of bottomhole pressure values for the plurality of wells and adjusting the current schedule based on the validating. The method may further include translating the schedule of bottomhole pressure values into a schedule of well settings through calibration of an integrated model. The method may also include displaying on a graphical user interface device the current schedule of well settings for the plurality of wells. The method may further include generating a signal and transmitting the signal to automatically actuate the well settings according to the current schedule of well settings for the plurality of wells.

A system of configuring well settings for wells in oil production field, in one aspect, may include at least one hardware processor. A display device may be operatively coupled to the hardware processor. The at least one hardware processor may receive a baseline schedule of well settings for a plurality of wells in the oil production field over a mid-term horizon, the baseline schedule representing a current schedule in initial iteration. The at least one hardware processor may generate a mid-term production prediction for a fluid production for each of the plurality of wells during the mid-term horizon by executing an integrated model that combines surface infrastructure and reservoir flow based on the current schedule of well settings for the plurality of wells. The at least one hardware processor may execute a plurality of decline models calibrated with respect to the mid-term production prediction and approximating a long-term production prediction for the plurality of wells. The at least one hardware processor may determine performance metrics based on the mid-term production prediction, which may include mid-term net present value, and on the long-term approximate production predictions, which may include a recovery factor for all field production in the plurality of wells, by executing an economic model that comprises mid-term estimation of oil sale price and of production costs. The at least one hardware processor may determine whether the performance metrics meet a defined criterion, for example, a number of constraints. The at least one hardware processor, responsive to determining that the performance metrics do not meet the defined criterion, may modify the current schedule and repeat the generating, the executing, the determining performance metrics until the defined criterion is met. The at least one hardware processor, responsive to determining that the performance metrics meet the defined criterion, may validate the current schedule of well settings for the plurality of wells and adjusting the current schedule based on the validating. The at least one hardware processor may also display on the display device the current schedule of well settings for the plurality of wells. The at least one hardware processor may generate a signal and transmit the signal to automatically configure the well settings according to the current schedule of well settings for the plurality of wells.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, a tool and method are disclosed for configuring well settings for hydrocarbon production in mature oil fields, and allow selecting of optimized well settings. Elaborating optimized schedules for the configuration of well settings leads to efficient production of the oil field. The system, tool and method of the present disclosure in one embodiment may provide schedules over a mid-term horizon (e.g., three years) for well settings for all or a subset of wells in an oil field. Mid-term in the present disclosure refers to a finite period or term. Mid-term may be defined, for example, as a finite number of years. Long-term in the present disclosure refers to a period or term that is longer duration than the defined mid-term. In one embodiment, the schedule is generated so that a performance metric for the considered horizon is maximized. In one embodiment, an economic metric, e.g., net present value, is considered, and production metrics, e.g., cumulative oil production, can also be used. In the present disclosure, the system and method in one embodiment may take into account long-term efficiency metrics such as the (lifelong) recovery factor for the complete field production. For example, minimum acceptable short-term and long-term (lifelong) metrics (e.g., short-term and long-term cumulative field oil production) can be included as target/constraints. The system of the present disclosure can also be directly used in the management of brownfields for wells controlled through settings other than bottomhole pressure and/or rates. Performance measures may be updated with a frequency consistent with how often one can modify well settings in practice (e.g., every few months).

Many well settings (e.g., wellhead choke size) can be related to well bottomhole pressure in the sense that constant well settings during a relatively long time interval (e.g., at least months) can be associated within acceptable accuracy for practical applications with constant bottomhole pressure values during the same time interval (this correspondence is not expected, in general, between well settings and well rates). However, the relation between well bottomhole pressure values and well settings (e.g., wellhead choke size) for the entire field is usually not straightforward to determine and, thus, may require computational simulation tools (e.g., an integrated model that includes surface infrastructure and subsurface reservoir). Thus, the computational cost associated with an integrated model is in general, considerably higher than the cost associated with the subsurface reservoir flow model.

Alternatively, one may address brownfield management via formal optimization and accurate simulation models to predict future production. These approaches typically yield optimization problems where a large number of optimization variables (e.g., bottomhole pressure values for all wells for all control time intervals) need to be solved because brownfields often have a relatively high number of wells (at least several tens and in many cases hundreds). The solving of this type of optimization problems based on only a subsurface reservoir model (i.e., not including surface infrastructure), for example, as proposed for bottomhole pressure values as control variables, may take days or even weeks even if high performance computing resources are used, and this might not be an attractive option in many practical scenarios where solutions are required in a much shorter time frame (e.g., overnight or in few days). It is expected that the solving of this type of optimization problems, based on an integrated model, directly via existing formal optimization methods may take significantly more time than days or weeks even within a high performance computing framework.

Optimal search may be accelerated using specific internal simulation information, as is the case, for example, of gradients computed by means of adjoints. However, very few commercial simulators output that type of information (which cannot be obtained without access to the simulator source code and substantial coding effort). A number of approaches that may be computationally efficient and also are not intrusive with respect to modeling software (e.g., procedures based on streamline simulation), output well rate information instead of well bottomhole pressure values and do not rely on formal optimization. However, well controls specified as well rates may be difficult to implement in practice. For example, it may be difficult to associate well rates that are constant during relatively long periods of time with well settings that do not need to be changed with higher frequency than what can be practically doable.

The system and method in one embodiment determine well settings that can be implemented in practice. In one embodiment, the number of degrees of freedom in the problem is reduced by selecting a subset of the K wells considered to be most important out of the entire set of N wells. In one embodiment, the most profitable wells are chosen, for example, those producers and injectors with most impact on performance metrics. The system of the present disclosure in one embodiment accelerates computation of metrics that rely on long-term predictions by means of approximation. Long-term predictions can be computationally expensive to estimate accurately; the level of uncertainty in these predictions may be high so it is reasonable to approximate them. In the present disclosure in one embodiment, a plurality of application modes may be proposed: for example, Mode 1 and Mode 2. Mode 1 may be in general the more accurate; and Mode 2, which is based on additional simplifications, can be as accurate as Mode 1 and computationally faster. For example, in one embodiment, Mode 2 can be computationally faster but less accurate than Mode 1. However, for brownfields with a relatively high number of wells (e.g., more than fifty) Mode 2 may be as accurate as Mode 1 because changes in the settings for one well do not have significant effect on the behavior of the whole system of wells, and, as a consequence, wells can be analyzed efficiently without considering strong coupling between them through surface infrastructure.

The system and method in one embodiment of the present disclosure provides for the optimized management of brownfields based on formal, solid principles and accurate prediction models, for example, in which injection and production wells may be controlled through settings other than bottomhole pressure and/or rates. There may be available rules of thumb or procedures to obtain educated guesses to determine other well settings than well bottomhole pressure and well rates, but due to their heuristic nature they lack accuracy and robustness, and in some cases they may fail unexpectedly and not provide acceptable solutions.

The interdependence between wells through the surface infrastructure and subsurface reservoir makes the conversion between well settings and well bottomhole pressure values or well rates, in general, complex enough to require computational assistance. There is a closer relation between well bottomhole pressure and many well settings than between well rate and many well settings. In one embodiment, the system of the present disclosure may utilize this relation. The system in one embodiment outputs optimized well settings (e.g., wellhead choke size) needed in mid-term horizon for brownfield reservoir management and may be based on formal, solid principles and accurate prediction models.

Mathematically approaches allow for determining well bottomhole pressure values. For example, an existing methodology is based on a subsurface reservoir model, not including surface infrastructure. These approaches that output well bottomhole pressure values typically need to solve an often quite high number of degrees of freedom (e.g., bottomhole pressure values for all wells for all control time intervals) and this is typically translated into very time-demanding tools. Other existing methodologies yield bottomhole pressure values with less computational cost, provided that one has access to the source code of the simulation software. However, that kind of access may not possible when commercial software is used.

The system in one embodiment of the present disclosure reduces the number of degrees of freedom by selecting a subset of the most important wells out of a set of N wells and the system accelerates simulation so that the system computes predictions accurately during a fraction of the production time frame. The system also efficiently approximates these predictions for the rest of the reservoir life. As a consequence, the system of the present disclosure can be significantly faster than existing approaches. Additionally, the system of the present disclosure is not intrusive with respect to the software used to model the different physical processes involved in the management of brownfields (e.g., reservoir flow simulation also referred to as reservoir flow model), and in one aspect, the system can be based on any existing and relevant simulation software tool. The system may incorporate an integrated simulation tool, a tool that combines surface infrastructure and subsurface reservoir, outputting required information.

Figure 1:
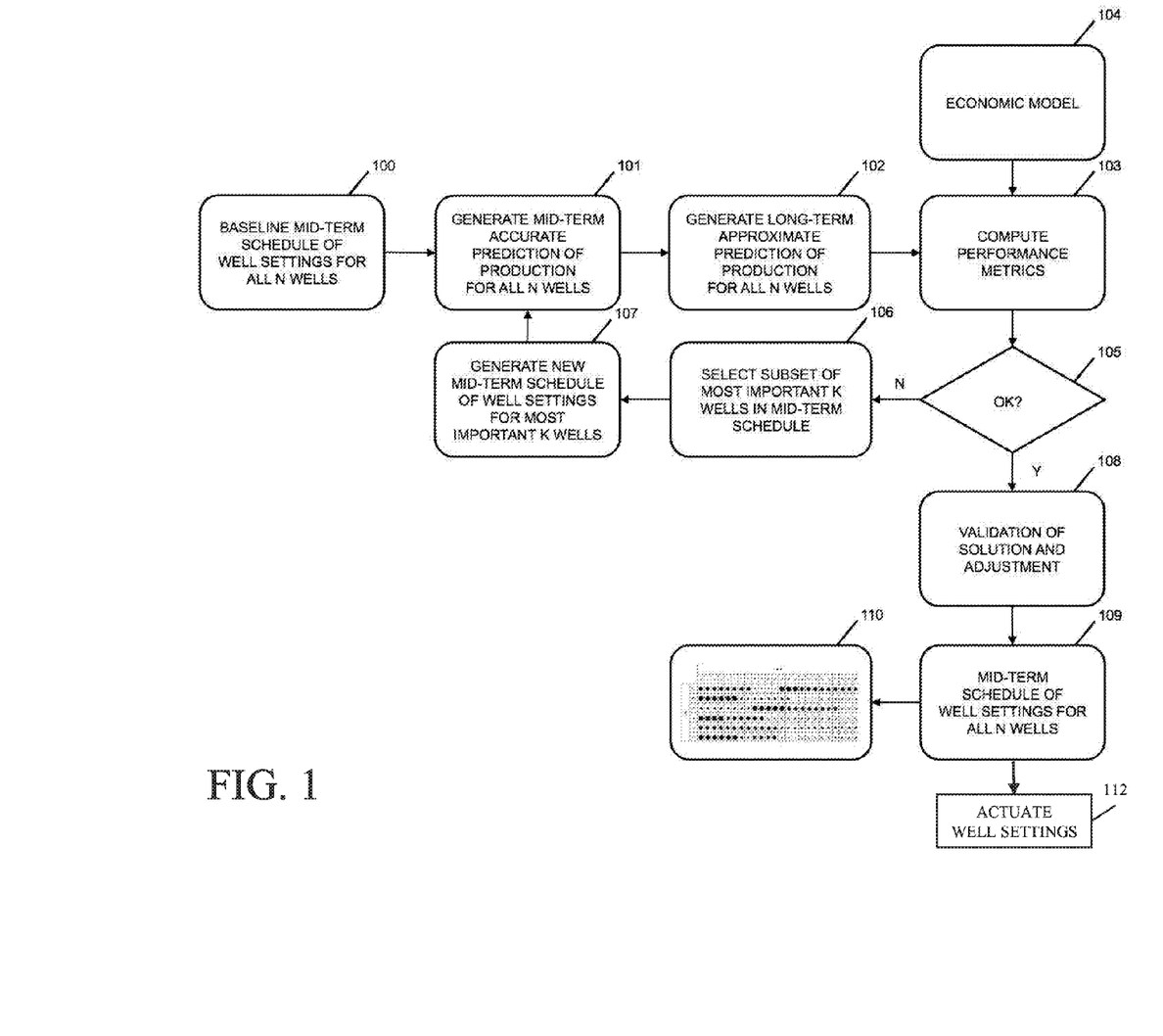
FIG. 1 is a block diagram illustrating a method for configuring well settings in one embodiment of a system of the present disclosure.

FIG. 1 is a block diagram illustrating Mode 1 in one embodiment of a system of the present disclosure. The system in one embodiment of the present disclosure may start at 100 with a baseline schedule of well settings for N wells in a field (N can be the total number of wells or a subset of wells) over a mid-term horizon (e.g., three years). In one embodiment, this baseline schedule pre-exists or may be determined, e.g., based on expert judgment. Examples of well settings may include wellhead choke size at injector wells, whether a wellhead choke should be shut, and frequency of electrical pumps at producers. At 101, based on the current schedule of well settings for N wells (which initially is the baseline schedule) the system generates a prediction for the fluid production for each of the N wells during the mid-term horizon using an integrated model that combines surface infrastructure and reservoir flow. The integrated model, for example, may include a surface infrastructure model whose output is coupled to an input of a reservoir flow model. In one aspect, the surface infrastructure model takes as input a set of well settings and outputs bottomhole pressure values. For instance, such surface infrastructure model may be built by modeling a relationship between the well settings and bottomhole pressure, for instance, based on data physics-based model. The integrated model also includes the reservoir flow model whose input is coupled to the output of the surface infrastructure model. The reservoir flow model takes as input, for example, well bottomhole pressure values and well rates, and outputs fluid flow, for example, water, oil and gas. The integrated model takes the well settings and outputs a prediction of how fluid flows in the reservoir.

At 102, the system approximates a long-term (lifelong) production prediction for all N wells, for example, based on a collection of decline models calibrated with respect to the mid-term prediction data. An example of a decline model may be built based on an exponential function that decays production in the wells over time. Since long-term predictions can be expensive to compute accurately and the level of uncertainty in these predictions is usually high, the system may approximate the long-term predictions in one embodiment.

At 103, performance and minimum acceptable metrics based on mid-term accurate predictions (e.g., mid-term net present value) and on long-term approximate predictions (e.g., recovery factor for the entire field production) may be determined. Performance metrics are usually cumulative metrics computed for all N wells. In one aspect, an economic model (104) that includes, e.g., mid-term estimation of the oil sale price and of the production costs, may determine the performance and minimum acceptable metrics. A performance metric may include a net present value which monetizes oil production less the cost of that production (e.g., cost for disposing of water and gas at the producers and/or the cost of injecting water at the injectors). The iteration at 105 (e.g., a loop that includes steps 101, 102, 103, 105, 106 and 107, and optionally 104) maximizes the net present value subject to a set of constraints such as the total amount of oil produced and maximum water injection rate, for example, based on an optimization model. In another aspect, performance and minimum acceptable metrics may include only oil production amount. In such a case, the economic model need not be run to compute performance metrics.

At 105, it is determined as to whether the performance metrics are acceptable, for example, according to a predefined criterion or a given threshold. A criterion may be predefined or given by a user, and may be configurable. For instance, a user may enter an input to the system of the present disclosure in one embodiment, a minimum acceptable metrics criterion or threshold. If according to a criterion or a given threshold, these performance metrics are not acceptable, the system in one embodiment modifies the current mid-term schedule as follows. At 106, the system selects a subset including the K most important wells in the current mid-term schedule out of the entire set of N wells. This selection can be based, for example, on clustering algorithms applied to the mid-term production prediction data where the most profitable wells are chosen (e.g., those producers and injectors with most impact on performance metrics). The subset of the K most important wells depends on the particular mid-term schedule, thus in one embodiment, the selection of this subset of K wells can be performed for all mid-term schedules considered. For example, all mid-term schedules generated in every iteration may be considered in selecting a subset of K wells. Then, the mid-term production schedule of well settings for the selected K wells is modified, and the associated new performance metrics are again computed as described above. For instance, at 107, new mid-term production schedule of well settings for the selected K wells are generated. The new mid-term production schedule may be generated based on mathematical optimization that determines improved well setting schedules for the selected K wells. The selection of the K wells aims at efficient exploration of possible modifications of the original schedule for the entire set of N wells.

If no selection is considered (i.e., K is equal to N) the number of negative responses at 105 can be expected to be much higher than when the mentioned selection is included, and this may have clear impact on computational performance. If the criterion at 105 is met (e.g., the performance metric value being measured is deemed acceptable), the mid-term schedule of well settings for all N wells is validated regarding accuracy with respect to the approximations introduced at 102, and adjusted accordingly at 108. For example, validation may be performed by the integrated model for long-term production. The resulting output may be compared to a threshold or a threshold range. Adjustments may be made based on other solutions (schedules) considered in the iterations. In one embodiment, the adjustments, in general, are small and do not require significant additional computing cost because the approximations usually considered in practice (e.g., use of decline models for long-term prediction of production) are very often satisfactorily accurate. At 109, the mid-term schedule of well settings can be displayed by means of a graphical user interface (GUI) or a display device, and/or provided as a soft/hard copy, for example, as shown at 110.

The well settings may be configured, for example, by controlling the well settings according to the schedule automatically via an electric or another signal. Responsive to receiving such signal, a mechanical device may automatically actuate the well settings. For example, a signal generated based on the well setting schedule automatically actuates the physical well settings at 112. For example, a hardware processor of the system executing the methodology shown in FIG. 1 may be communicatively coupled to wellhead chokes or mechanical devices that control the wellhead chokes and/or electric pumps.

Figure 2:
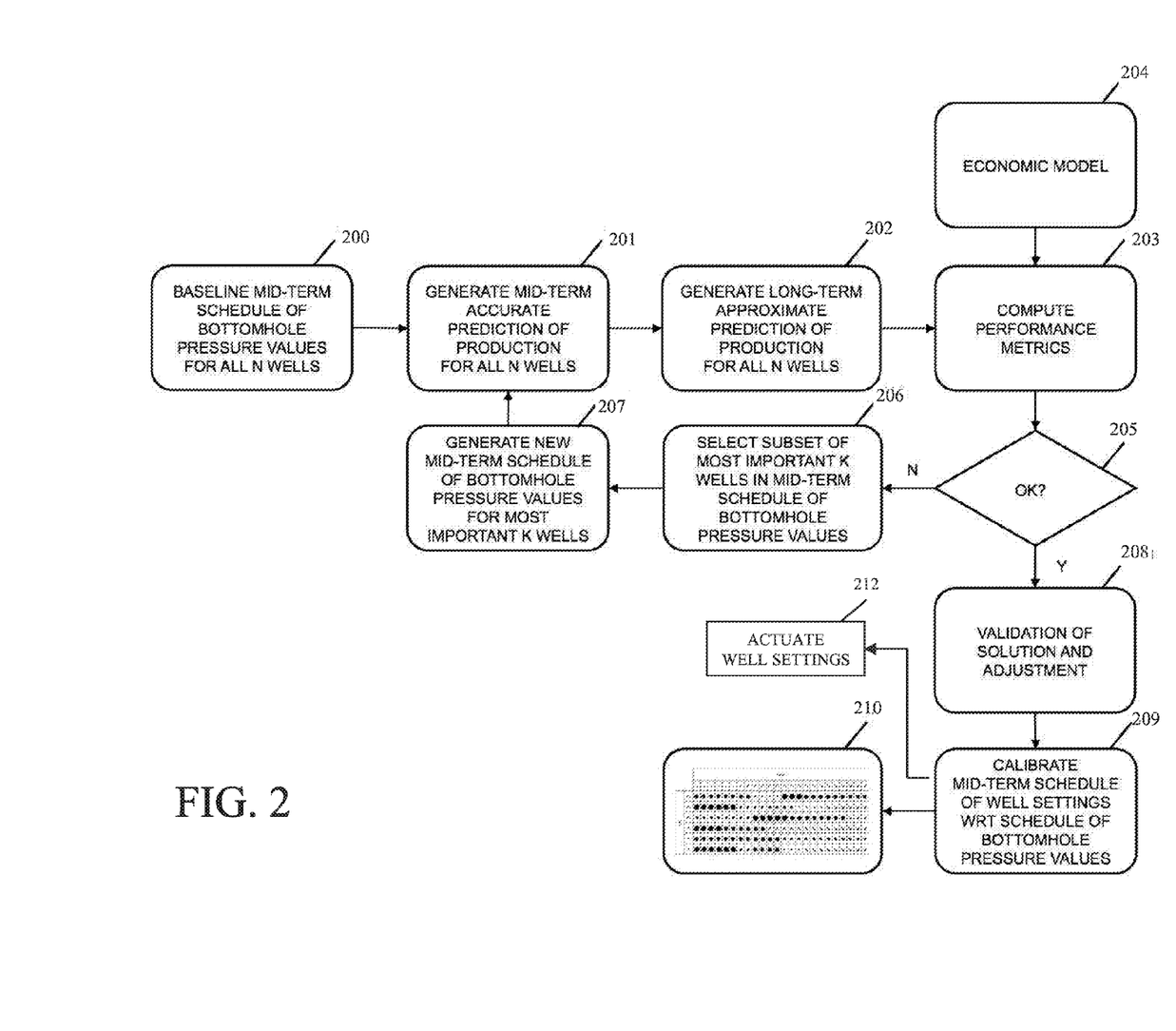
FIG. 2 is a block diagram illustrating a method for configuring well settings in another embodiment of the present disclosure.

FIG. 2 is a block diagram illustrating Mode 2 in one embodiment of the present disclosure. In Mode 2, the system may replace the integrated model evaluated (in principle, multiple times) in Mode 1 in 201 by one of its constitutive sub-models, a reservoir flow model. The reservoir flow model models or builds a relationship between, for example, well bottomhole pressure and output fluid flow. The relationship may be also modeled between, for example, well rates and output fluid flow. This sub-model in general is faster to evaluate than the integrated model but has as input well bottomhole pressure values and not well settings that are directly implementable in practice such as wellhead choke sizes; e.g., the output at 205 and at 208 for Mode 2 is a mid-term schedule of bottomhole pressure values for all N wells. The output at 208 is translated to a schedule of well settings through calibration of the integrated model. For example, using the surface infrastructure model of the integrated model described above in Mode 1, the bottomhole pressure values can be translated into well settings. The system in this embodiment may start at 200 with a baseline schedule of bottomhole pressure values for all N wells in a field (as before, N can be the total number of wells or a subset of wells) over a mid-term horizon (e.g., three years). This baseline schedule may pre-exist or can be determined, e.g., based on expert judgment. The system in one embodiment at 201 then generates a prediction for the fluid production for each of the N wells during the mid-term horizon, for example, using the reservoir flow model. In one aspect, the reservoir flow model may be a simulation model.

At 202, the system approximates a long-term (lifelong) production prediction for all N wells, for example, based on a collection of decline models calibrated with respect to the mid-term prediction data. An example of a decline model is an exponential decay function over time. Since long-term predictions can be expensive to compute accurately and the level of uncertainty in these predictions is usually high, the system in one embodiment of the present disclosure may approximate the long-term predictions.

At 203, the system determines performance and minimum acceptable metrics based on mid-term accurate predictions (e.g., mid-term net present value) and on long-term approximate predictions (e.g., recovery factor for the entire field production), for example, using an economic model at 204 that includes, e.g., mid-term estimation of the oil sale price and of the production costs. The economic model may be the economic model shown at 104 in FIG. 1. In one aspect, the performance metric may include amount of oil production rather than the net present value, in which case the economic model at 204 need not be run. Instead, the performance metric (e.g., oil production) may be translated directed from the output of the reservoir flow model.

At 205, if according to a criterion or a defined threshold, these performance metrics are not acceptable, the system modifies the current mid-term schedule as follows. At 206, the system selects a subset of the K most important wells in the current mid-term schedule out of the entire set of N wells. This selection can be based, for example, on clustering algorithms applied to the mid-term production prediction data where the most profitable wells are chosen (e.g., those producers and injectors with most impact on performance metrics). In one aspect, the subset of the K most important wells depends on the particular mid-term schedule (thus, the selection of this subset of K wells is performed for all mid-term schedules considered). Then, the system modifies the mid-term production schedule of bottomhole pressure values for the selected K wells. For example, at 207, the system generates a new mid-term production schedule of bottomhole pressure values for the selected K wells, and at 201, the associated new performance metrics are again computed as described above using the modified or new mid-term production schedule of bottomhole pressure values for the selected K wells.

The selection of the K wells aims at an efficient exploration of possible modifications of the original schedule for the entire set of N wells. If no selection is considered (i.e., K is equal to N) the number of negative responses after 205 can be expected to be higher than when the mentioned selection is included, and this would have impact on computational performance.

If the criterion at 205 is met, for example, performance metrics are deemed acceptable, the mid-term schedule of bottomhole pressure values for all N wells is validated regarding accuracy with respect to the approximations introduced at 202, and adjusted accordingly at 208. In one aspect, the adjustments, in general, are small and do not require significant additional computing cost because the approximations usually considered in practice (e.g., use of decline models for long-term prediction of production) are very often satisfactorily accurate.

At 209, the schedule of bottomhole pressure values obtained is translated into a schedule of well settings through calibration of the integrated model. For instance, a surface infrastructure model that models a relationship between well settings and bottomhole pressure may be employed to translate the bottomhole pressure values into well settings. For brownfields with a relatively high number of wells (e.g., more than fifty), this calibration may require less evaluations of the integrated model than those needed in Mode 1. In one aspect, since in Mode 2 the calibration is performed only at the end of the process, the accuracy in the output of Mode 2 may be lower than in Mode 1.

At 210, the mid-term schedule of well settings determined at 209, can be displayed by means of a GUI on a display device and/or a soft/hard copy. The well settings may be configured, for example, by controlling the well settings according to the schedule automatically via an electric or another signal. Responsive to receiving such signal, a mechanical device may automatically actuate the well settings. For example, a signal generated based on the well setting schedule automatically actuates the physical well settings at 212. For example, a hardware processor of the system executing the methodology shown in FIG. 2 may be communicatively coupled to wellhead chokes or mechanical devices that control the wellhead chokes and/or electric pumps.

Figure 3:
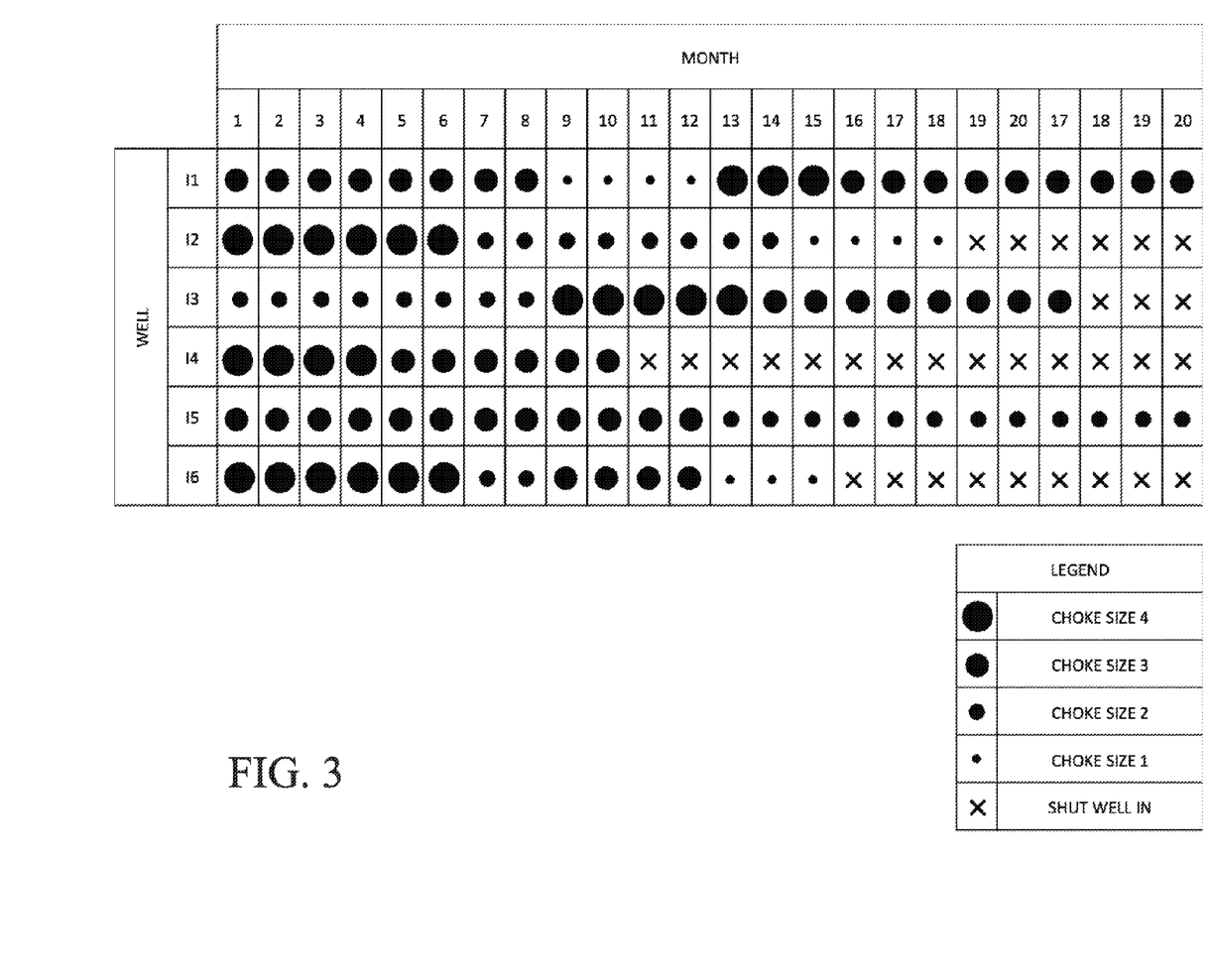
FIG. 3 shows an example of the graphical output that is generated in one embodiment for well settings associated with wellhead choke sizes for a number of injectors in the field.

FIG. 3 shows an example of the graphical output that is generated (e.g., shown in FIG. 1 at 110 or FIG. 2 at 210) when well settings are wellhead choke sizes for a number of injectors in the field. Well settings for producers are not shown in this example. This table represents the mid-term schedule (20 months in this case) that specifies on a monthly basis the corresponding choke sizes needed for N=6 injectors in the field (denoted as I1, I2, I3, I4, I5 and I6). In this example, it is assumed that four choke sizes are available, which are represented by circles of different radius. The schedule also indicates if one or more of the wells have to be shut in, denoted in the table by means of a cross sign.

Figure 4A:
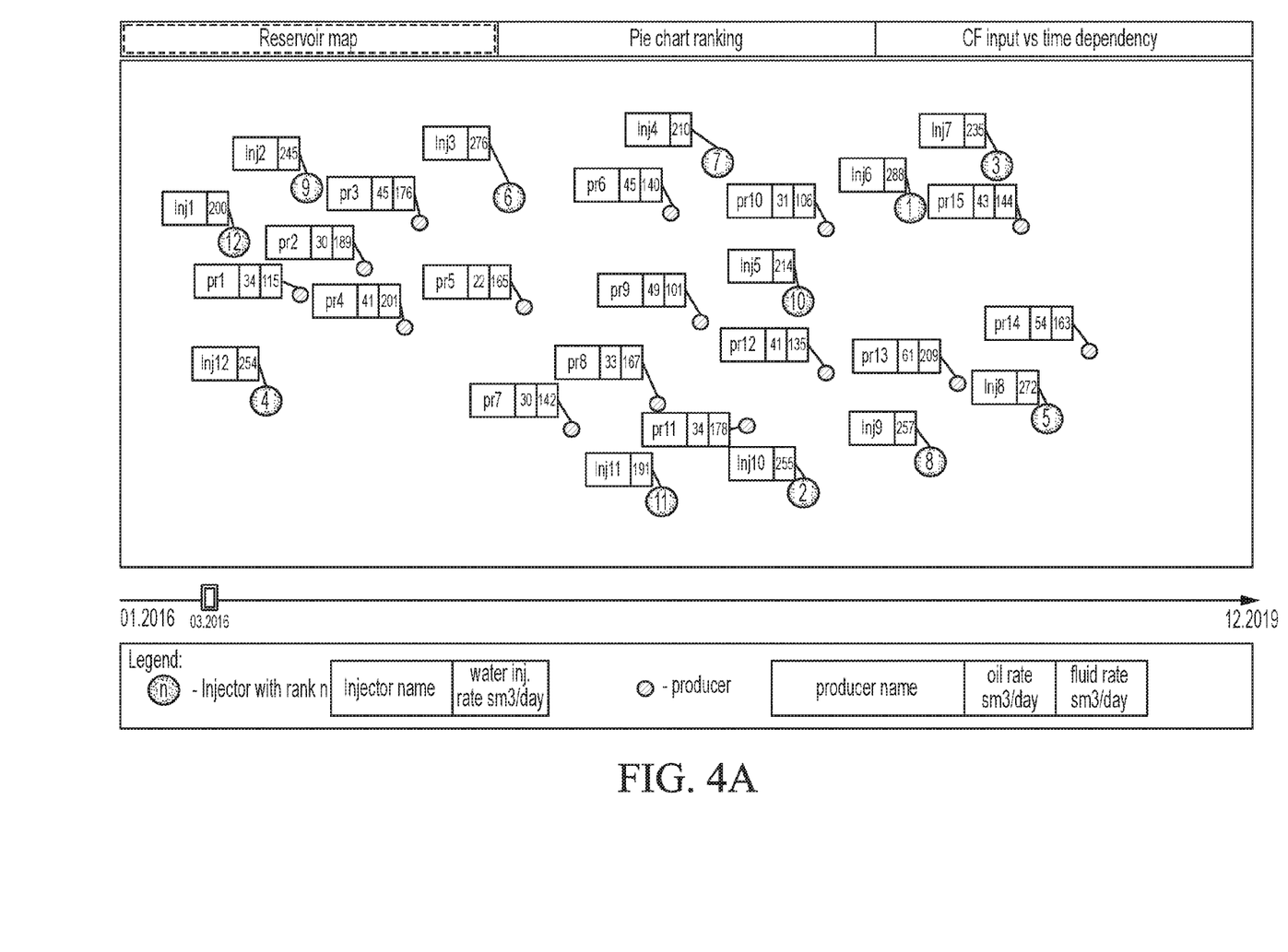
FIGS. 4A-4D illustrate GUI screenshots in one embodiment of the present disclosure.

FIGS. 4A-4D illustrate GUI screenshots in one embodiment of the present disclosure. The screenshot of the GUI in FIG. 4A shows the distribution of all wells (injectors and producers) in the reservoir with the well names and the injection rate and oil and fluid production rates for injectors and producers, respectively, during the time indicated in the scroll bar in the lower part of the screen (now at "03.2016"). The GUI also indicates the ranking for the injectors with a number inside a blue circle (the ranking is based on the individual contribution in the total cash flow or net present value associated with the production of the reservoir). In this example, the system may be interested in adjusting well settings for injectors, and therefore, the system may rank this type of wells. For adjusting wells settings for producers, the GUI may show the ranking associated with these wells too.

Clicking on or selecting a well (or each well) via an input device triggers the GUI to display or present additional information. This is shown on the screenshot of FIG. 4B, where for each well, the GUI represents connected producers and numerical data used in the ranking.

Figure 4B:
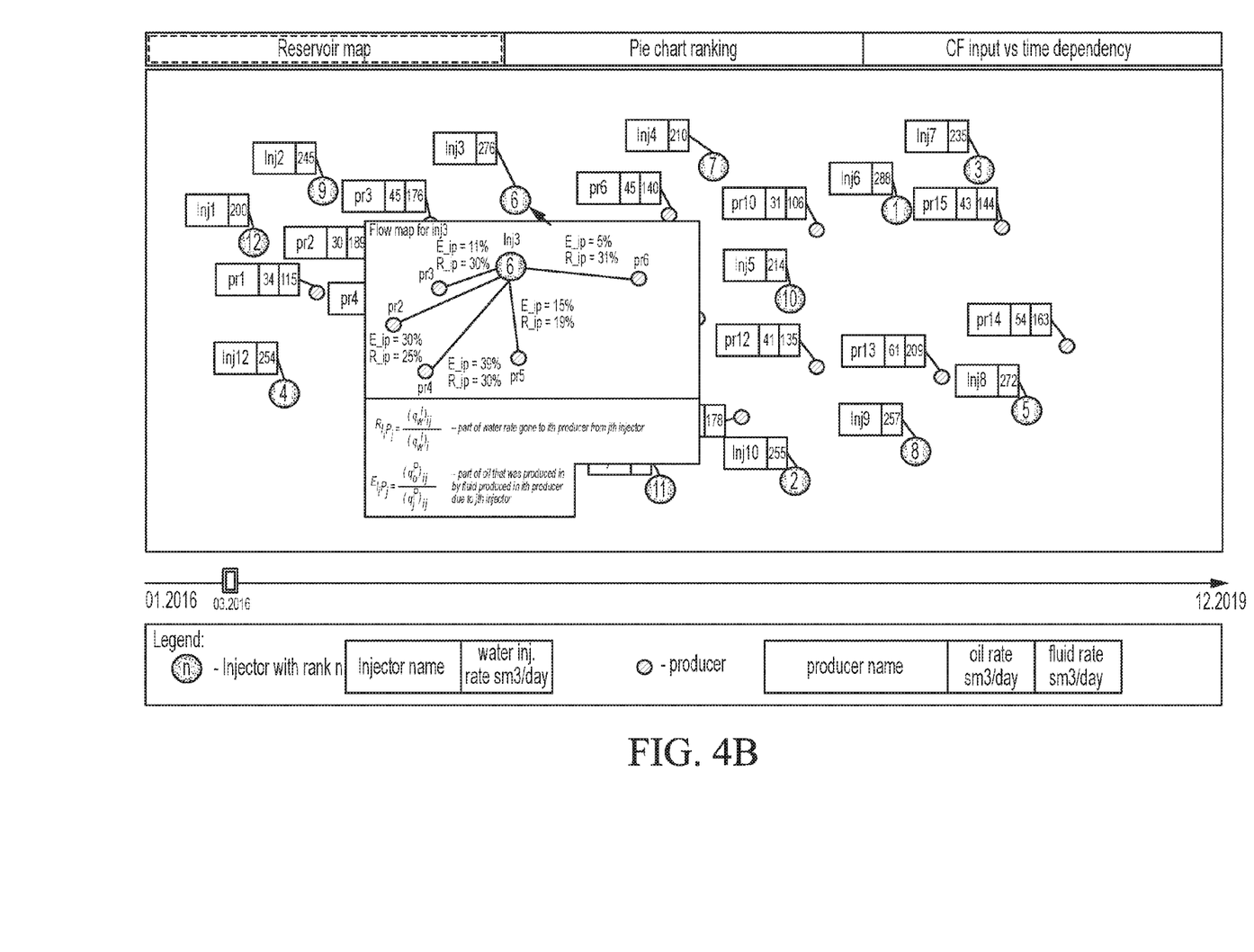
Figure 4C:
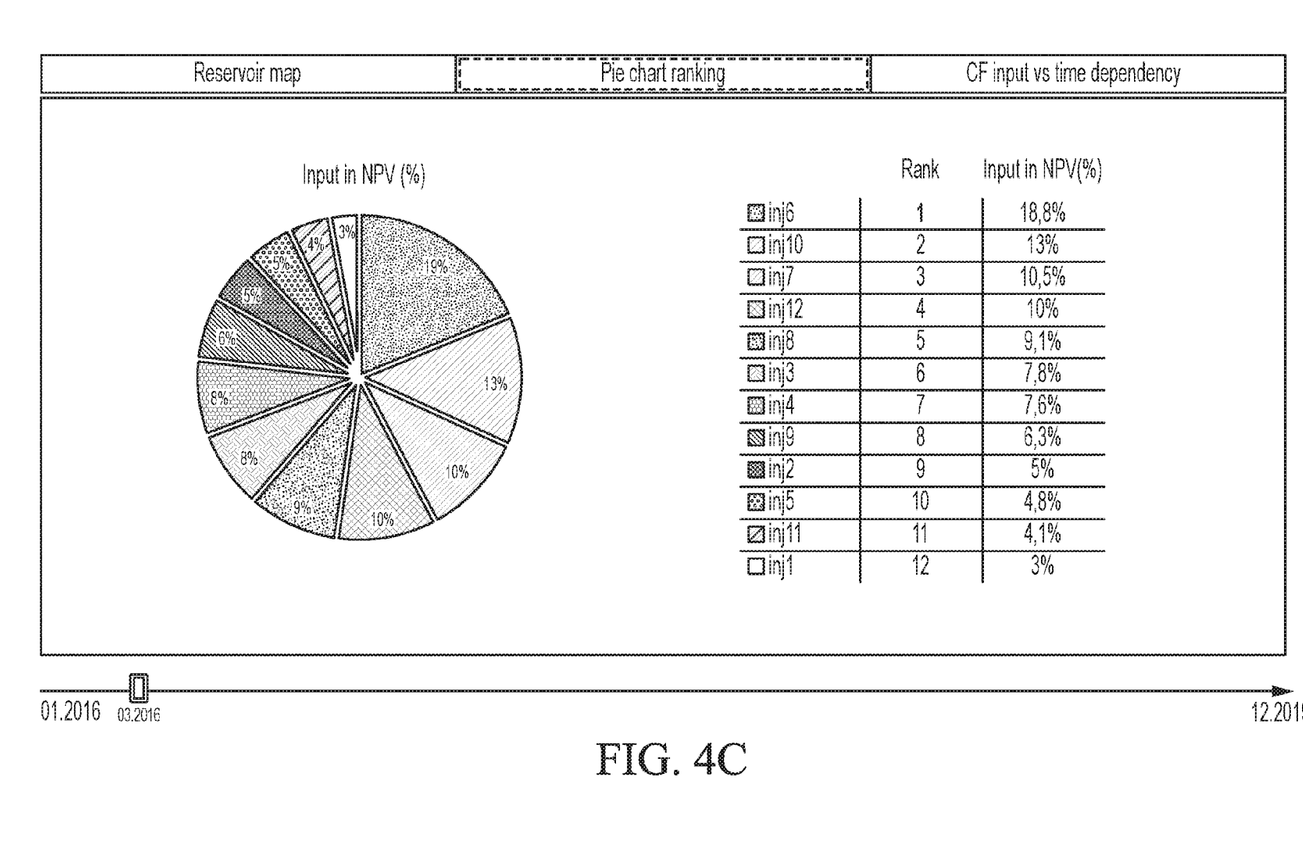
Figure 4D:
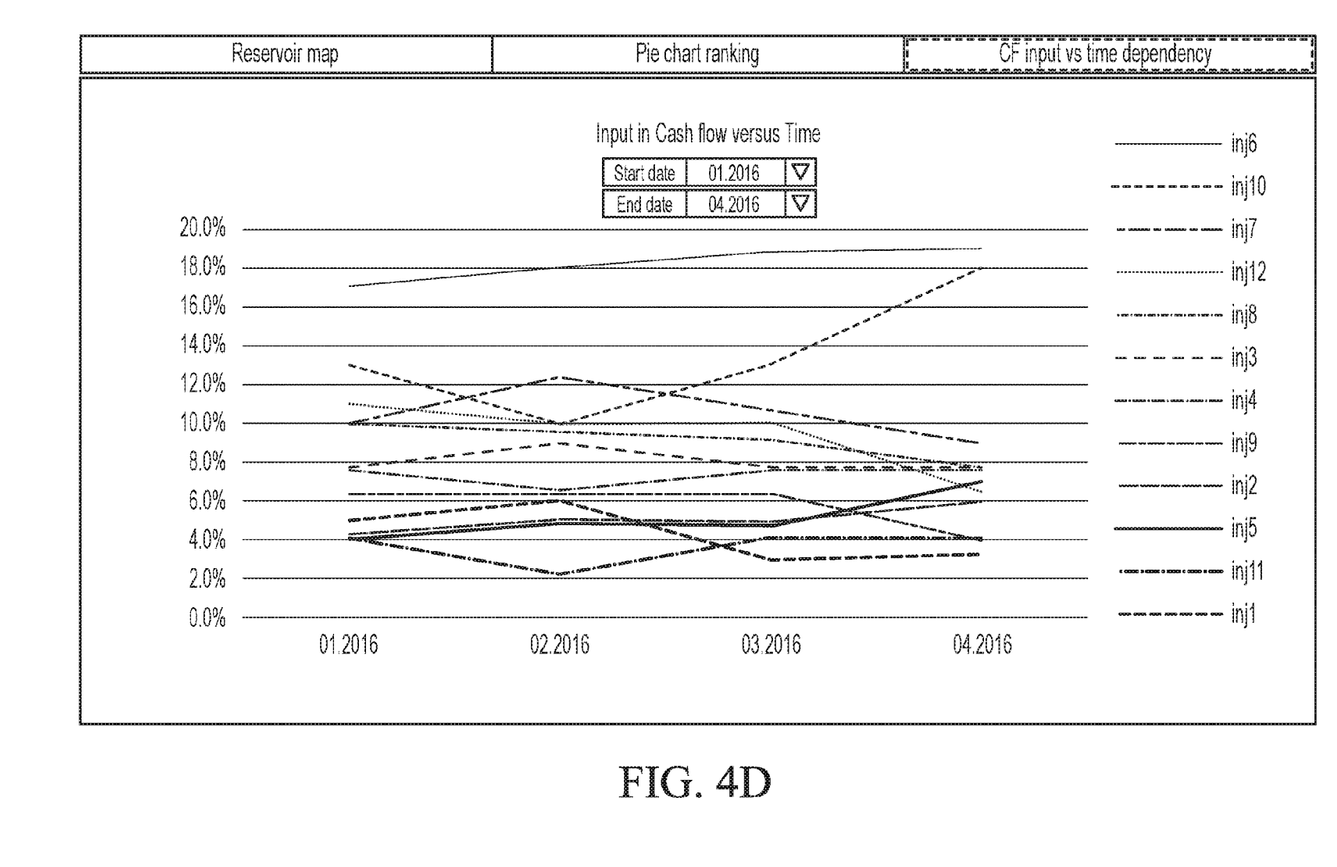

The upper part of the GUI in FIG. 4B has three tabs. FIG. 4B's screenshot shows information associated with the "Reservoir map" tab. The second tab, "Pie chart ranking," is illustrated on the screenshot shown in FIG. 4C and represents a pie-chart ranking associated with the injectors based on total cash flow or net present value during the time indicated in the scroll bar in the lower part of the screen. The evolution of the ranking and individual contribution for all the injectors in total cash flow or net present value between two times given by the user is shown on the screenshot of the GUI in FIG. 4D, which corresponds to the third tab "CF input vs. time dependency."

In one embodiment, the system of the present disclosure may rank injectors and producers separately. For instance, the user may decide how many producers and injectors are to be selected and input the number of producers and injectors to be selected. The ranking of each type of wells (e.g., injectors and producers) is based on a given performance measure associated with the production of the field of interest (e.g., individual contribution of each well in total cash flow, total cash flow to capital expenditure ratio and total cash flow to operating expense ratio).

To establish a relation between all wells, the system in one embodiment may determine well interconnection matrices. These matrices can be computed, for example, through information from streamline-based reservoir flow simulation. The performance measures above can be determined using well interconnection matrices and reservoir flow simulation output such as water injection rates, oil production rates and fluid production rates. In one aspect, the well interconnection matrix and the injection/production rates may vary as a function of time, which implies that the ranking of wells may change too.

While the above description addressed a challenging situation where well settings are not well bottomhole pressure (BHPs) values or well rates, the system and method of the present disclosure, in one aspect, may also be employed for well settings that are BHPs. In this scenario, Mode 2 described with reference to FIG. 2 may be implemented without the translating (calibration) step shown at 209, omitting that step.

Likewise, the system and method of the present disclosure, in another aspect, may be employed for well settings that are well rates. For example, existing approaches that may be computationally efficient and also are not intrusive with respect to modeling software (e.g., procedures based on streamline simulation) that output well rate information may be incorporated into or combined with iterating of selecting a subset of most important K wells in mid-term schedule of well rates, generating new mid-term schedule of well-rates for most important K wells, generating mid-term accurate prediction of production for all N wells, generating long-term approximate prediction of production for all N wells, computing performance metrics, until an acceptable computing performance metric is determined.

Figure 5:
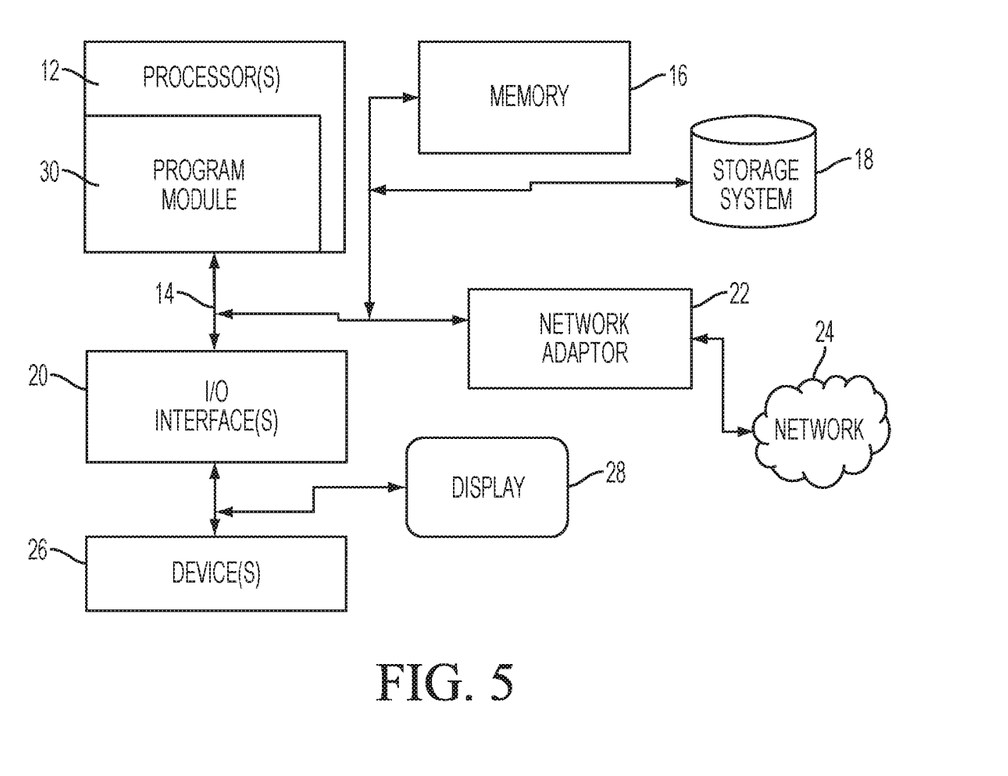
FIG. 5 illustrates a schematic of an example computer or processing system that may implement a well configuring system in one embodiment of the present disclosure.

FIG. 5 illustrates a schematic of an example computer or processing system that may implement a well configuring system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of configuring well settings for wells in oil production field, the method performed by at least one hardware processor, comprising:

receiving a baseline schedule of well settings for a plurality of wells in the oil production field over a mid-term horizon, the baseline schedule representing a current schedule in initial iteration;

generating a mid-term production prediction for a fluid production for each of the plurality of wells during the mid-term horizon by executing an integrated model that combines surface infrastructure and reservoir flow based on the current schedule of well settings for the plurality of wells;

executing a plurality of decline models calibrated with respect to the mid-term production prediction and approximating a long-term production prediction for the plurality of wells;

determining performance metrics based on the mid-term production prediction comprising mid-term net present value and on the long-term approximate production predictions comprising a recovery factor for all field production in the plurality of wells by executing an economic model that comprises mid-term estimation of oil sale price and of production costs;

determining whether the performance metrics meet a defined criterion;

responsive to determining that the performance metrics do not meet the defined criterion, modifying the current schedule and repeating the generating, the executing, the determining performance metrics until the defined criterion is met;

responsive to determining that the performance metrics meet the defined criterion, validating the current schedule of well settings for the plurality of wells and adjusting the current schedule based on the validating; and generating a signal and transmitting the signal to automatically configure the well settings according to the validated current schedule of well settings for the plurality of wells.

2. The method of claim 1, wherein the baseline schedule is pre-determined.

3. The method of claim 1, wherein the well settings comprise wellhead choke sizes.

4. The method of claim 1, wherein the well settings comprises frequency of electrical pumps.

5. The method of claim 1, wherein the modifying the current schedule comprises selecting a subset of the plurality of wells and modifying the current schedule of well settings for the selected subset of the plurality of wells.

6. The method of claim 5, wherein the subset of the plurality of the wells is selected by executing a clustering algorithm on the mid-term production prediction and selecting a cluster with producers and injectors with most impact on the performance metrics.

7. A method of configuring well settings for wells in oil production field, the method performed by at least one hardware processor, comprising:

receiving a baseline schedule of bottomhole pressure values for a plurality of wells in the oil production field over a mid-term horizon, the baseline schedule representing a current schedule in initial iteration;

generating a mid-term production prediction for a fluid production for each of the plurality of wells during the mid-term horizon by executing a reservoir flow model based on the current schedule of bottomhole pressure values for the plurality of wells;

executing a plurality of decline models calibrated with respect to the mid-term production prediction and approximating a long-term production prediction for the plurality of wells;

determining performance metrics based on the mid-term production prediction comprising mid-term net present value and on the long-term approximate production predictions comprising a recovery factor for all field production in the plurality of wells by executing an economic model that comprises mid-term estimation of oil sale price and of production costs;

determining whether the performance metrics meet a defined criterion;

responsive to determining that the performance metrics do not meet the defined criterion, modifying the current schedule and repeating the generating, the executing, the determining performance metrics until the defined criterion is met;

responsive to determining that the performance metrics meet the defined criterion, validating the current schedule of bottomhole pressure values for the plurality of wells and adjusting the current schedule based on the validating;

translating the schedule of bottomhole pressure values into a schedule of well settings through calibration of an integrated model; and generating a signal and transmitting the signal to automatically configure the well settings according to the validated current schedule of well settings for the plurality of wells.

8. The method of claim 7, wherein the baseline schedule is pre-determined.

9. The method of claim 7, wherein the well settings comprise wellhead choke sizes.

10. The method of claim 7, wherein the well settings comprises frequency of electrical pumps.

11. The method of claim 7, wherein the modifying the current schedule comprises selecting a subset of the plurality of wells and modifying the current schedule of bottomhole pressure values for the selected subset of the plurality of wells.

12. The method of claim 11, wherein the subset of the plurality of the wells is selected by executing a clustering algorithm on the mid-term production prediction and selecting a cluster with producers and injectors with most impact on the performance metrics.

13. A system of configuring well settings for wells in oil production field, comprising:

at least one hardware processor;

a display device operatively coupled to the hardware processor;

the at least one hardware processor receiving a baseline schedule of well settings for a plurality of wells in the oil production field over a mid-term horizon, the baseline schedule representing a current schedule in initial iteration;

the at least one hardware processor generating a mid-term production prediction for a fluid production for each of the plurality of wells during the mid-term horizon by executing an integrated model that combines surface infrastructure and reservoir flow based on the current schedule of well settings for the plurality of wells;

the at least one hardware processor executing a plurality of decline models calibrated with respect to the mid-term production prediction and approximating a long-term production prediction for the plurality of wells;

the at least one hardware processor determining performance metrics based on the mid-term production prediction comprising mid-term net present value and on the long-term approximate production predictions comprising a recovery factor for all field production in the plurality of wells by executing an economic model that comprises mid-term estimation of oil sale price and of production costs;

the at least one hardware processor determining whether the performance metrics meet a defined criterion;

the at least one hardware processor, responsive to determining that the performance metrics do not meet the defined criterion, modifying the current schedule and repeating the generating, the executing, the determining performance metrics until the defined criterion is met;

the at least one hardware processor, responsive to determining that the performance metrics meet the defined criterion, validating the current schedule of well settings for the plurality of wells and adjusting the current schedule based on the validating;

the at least one hardware processor causing displaying on the display device the validated current schedule of well settings for the plurality of wells; and the at least one hardware processor generating a signal and transmitting the signal to automatically configure the well settings according to the validated current schedule of well settings for the plurality of wells.

14. The system of claim 13 wherein the at least one hardware processor is communicatively coupled to a wellhead choke.

15. The system of claim 13, wherein the baseline schedule is pre-determined.

16. The system of claim 13, wherein the well settings comprise wellhead choke sizes.

17. The system of claim 13, wherein the well settings comprises frequency of electrical pumps.

18. The system of claim 13, wherein the modifying the current schedule comprises selecting a subset of the plurality of wells and modifying the current schedule of well settings for the selected subset of the plurality of wells.

19. The system of claim 18, wherein the subset of the plurality of the wells is selected by executing a clustering algorithm on the mid-term production prediction and selecting a cluster with producers and injectors with most impact on the performance metrics.

20. A computer program product for configuring well settings for wells in oil production field, the computer program product comprising a computer readable storage medium having program instructions embodied therewith, wherein the computer readable storage medium is not a transitory signal per se, the program instructions readable by a device to cause the device to perform a method comprising:

receiving a baseline schedule of well settings for a plurality of wells in the oil production field over a mid-term horizon, the baseline schedule representing a current schedule in initial iteration;

generating a mid-term production prediction for a fluid production for each of the plurality of wells during the mid-term horizon by executing an integrated model that combines surface infrastructure and reservoir flow based on the current schedule of well settings for the plurality of wells;

executing a plurality of decline models calibrated with respect to the mid-term production prediction and approximating a long-term production prediction for the plurality of wells;

determining performance metrics based on the mid-term production prediction comprising mid-term net present value and on the long-term approximate production predictions comprising a recovery factor for all field production in the plurality of wells by executing an economic model that comprises mid-term estimation of oil sale price and of production costs;

determining whether the performance metrics meet a defined criterion;

responsive to determining that the performance metrics do not meet the defined criterion, modifying the current schedule and repeating the generating, the executing, the determining performance metrics until the defined criterion is met;

responsive to determining that the performance metrics meet the defined criterion, validating the current schedule of well settings for the plurality of wells and adjusting the current schedule based on the validating; and generating a signal and transmitting the signal to automatically configure the well settings according to the validated current schedule of well settings for the plurality of wells.

* * * * *